March 29, 1966 W. G. BLENMAN ETAL 3,242,764
ADJUSTABLE CONTROL MECHANISM
Filed April 23, 1964
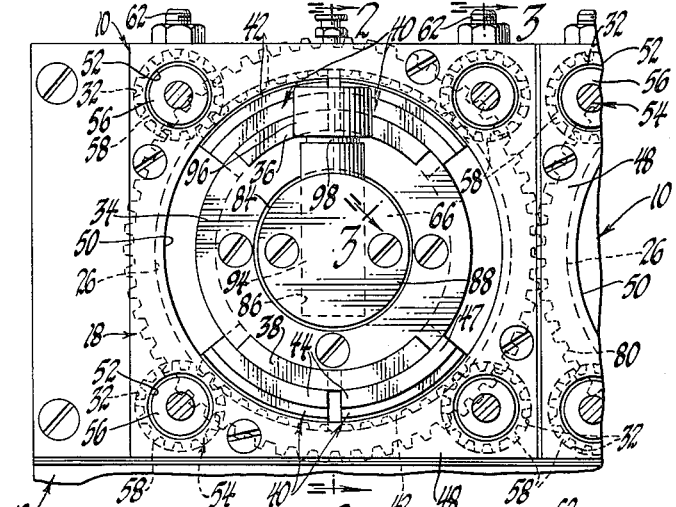
Fig. 1
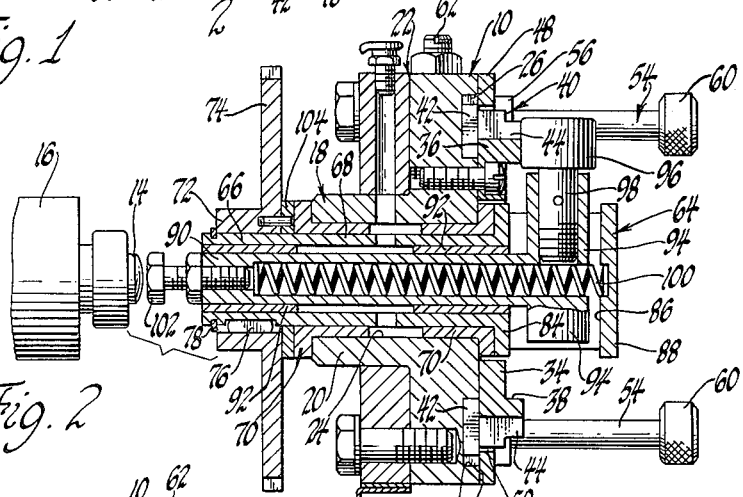
Fig. 2
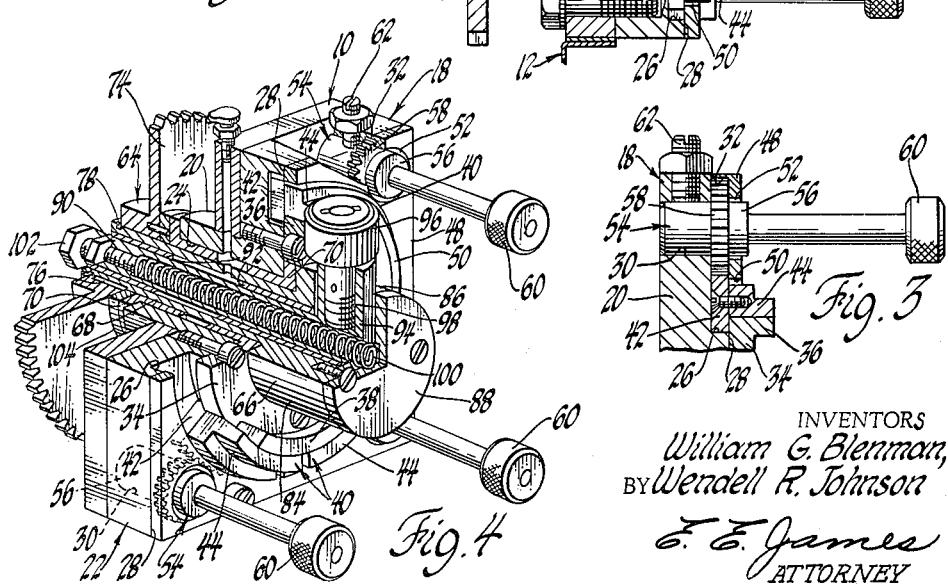
Fig. 3
Fig. 4
INVENTORS
William G. Blenman, &
BY Wendell R. Johnson
E. E. James
ATTORNEY United States Patent Office 3,242,764
Patented Mar. 29, 1966

3,242,764
ADJUSTABLE CONTROL MECHANISM
William G. Blenman, Grosse Pointe, and Wendell R. Johnson, Utica, Mich., assignors to General Motors Corporation, Detroit, Mich., a corporation of Delaware
Filed Apr. 23, 1964, Ser. No. 362,026
13 Claims. (Cl. 74—568)

This invention relates generally to control mechanisms; more particularly to mechanisms operable to control the sequential operation of an associated power driven machine; and with regard to its several more specific aspects, to control mechanisms having adjustable cam means adapted to modify sequential machine operations performed on conveyor driven workpieces.

The invention particularly contemplates an improved control mechanism for a power driven machine having angularly adjustable, annular cam forming means of relatively simple, easily fabricated, rugged design permitting in-service cam adjustment. Such cam adjustment provides accurate actuation of machine sequence controlling means including a rotatable, reiprocably mounted cam engaging follower drivingly synchronized with the power drive of the machine or workpiece transporting conveyor. Where a particular machine may sequentially perform a number of required operations on each workpiece, the invention further permits the driving interconnection and use of such conveyor and machine synchronizing control mechanisms to coordinate and actuate a plurality of machine operating controls to provide desired workpiece transporting conveyor drive and machine operating sequential control.

An adjustable cam control mechanism constructed in accordance with the invention has been used to control an automatic conveyor synchronized paint spray machine such as disclosed in United States Patent Application Serial No. 296,572, filed July 22, 1963 in the name of William G. Blenman and entitled "Paint Spraying Apparatus." Control devices for such automatic paint spraying equipment must be explosion proof to permit use in the explosive atmosphere generated by the highly volatile, quick drying thinners normally used in such paint spraying operations. Hence, air controls have generally been preferred for such paint spray machines. Electrical control components must be of a non-arcing type and enclosed in an air-tight, fresh air ventilated box or located remotely of the paint spray booth. These requirements for the safe use of electrical control components unduly complicate the plumbing connections required to sequentially supply pressurized actuating air to the several machine components and pressurized air and multiple paint colors and thinner to the workpiece traversing spray guns.

In the past, certain control functions have been provided in such paint spraying equipment by remotely located electrically timed relay operating switches and by independent air relay control valves or switches mounted on movable portions of the paint spraying machine in positions causing sequence controlling actuation at extreme ends of machine travel. However, such machine mounted air valve switches and the connected flexible plumbing necessarily increase the reciprocating inertial mass, the structural strength, and the driving power required of the movable machine portions and also increase the bearing loads and structural frame requirements of such machines. Previous air operated control mechanisms have also required stopping the paint spraying machine and the body or workpiece transporting conveyor to permit step-by-step control adjustment to assure proper workpiece spraying operation of the machine.

In the overhead paint spray machine disclosed in the above-identified patent application, several adjustable timing control mechanisms embodying the invention are mounted in side-by-side common drive relation on a stationary overhead mounted machine frame. The reciprocable cam engaging followers of these several control mechanisms are drivingly interconnected and rotatably driven in synchronized phased relation to the drive of an overhead conveyor transporting vehicle bodies through a body painting booth or tunnel. The support mounted annular cams of these several control units permit angular adjustment during continued conveyor driving movement of the vehicle bodies and machine operation to provide proper body painting control of the paint spray machine. The adjustable annular cams of the several control units may sequentially energize the drive of the paint spray machine for body traversing movement, raise and lower the spray gun supporting boom structure relative to the body roof and front and rear deck portions and initiate and stop paint spraying operation of the machine relative to such body portions during conveyor movement of each vehicle body past the overhead mounted position of the paint spray machine.

While the timing control mechanism particularly disclosed herein is intended to control certain sequential operations of the overhead paint spraying machine of the above-cited patent application, its use is not restricted to similar limited motion machines. With proper modification of the adjustable cam segments and cam follower drive means, similar timing control mechanisms may be used to provide intermittent conveyor drive relative to sequentially controlled machines or to energize conveyor associated machines mounted for pickup and movement with each succeeding workpiece while sequentially performing certain manufacturing operations and then returning the machine to its initial starting position for similar pickup, movement and sequential operation with the next succeeding conveyor transported workpiece.

The foregoing and other objects, advantages and features of the invention will be apparent from the following description of the preferred illustrative embodiment having reference to the several drawings, in which:

FIGURE 1 is a front elevational view of an adjustable control actuating mechanism constructed in accordance with the invention;

FIGURE 2 is a sectional view taken substantially in the plane indicated at 2—2 in FIGURE 1 further showing the illustrative control mechanism mounted in spaced actuating relation to a machine sequence controlling device partially shown in side elevation;

FIGURE 3 is a fragmentary sectional view of the cam adjusting elements of the illustrative control mechanism taken substantially in the plane indicated at 3—3 of FIGURE 1; and FIGURE 4 is a perspecive view broken away and partially sectioned to further show certain structural details and interrelationships between the several elements of the illustrative control mechanism.

The adjustable cam timing control mechanism of the invention is indicated generally in the several figures of the drawings by the reference numeral 10. This timing control mechanism 10 is preferably mounted on the stationary frame 12 of an associated machine and may be mounted in side-by-side common drive relation with an adjacent unit partially shown in FIGURE 1. These several control mechanisms are independently adjustable and cooperate to control and synchronize the sequential operation of the machine in accordance with the drive of the machine or of workpiece transporting conveyor. As shown in FIGURE 2 each control mechanism 10 includes cam supporting member 18 mounted in spaced coaxial relation to a reciprocably mounted plunger or actuating button 14 of a control device 16, such as an air valve or electrical relay switch, operable to control the operation of the associated machine.

The cam supporing member 18 has a coaxial cylindrical flange 20 spaced coaxially of the control device operating plunger, a square radial end flange 22 distal from the control device, and a central bore 24 extending axially therethrough. The radial end flange 22 supports the adjustable cam means of the control mechanism and has an annular groove 26 spaced radially outwardly and concentrically of the bore 24 and opening to the radial flange end face 28. Each corner of the end flange 22 has a bore 30 extending therethrough in parallel axial relation to the central axis of the support member. These corner adjacent bores are equally spaced angularly and radially and are each counterbored at 32 from the radial flange end surface 28. As best seen in FIGURE 1, each of these four counterbores inwardly intersects the end flange groove 26.

An annular cam member 34 is suitably secured to the end flange 22 coaxially of the cylindrical flange and central bore of the support member. The circular base flange of this cam member overlaps the inner periphery of the annular end flange groove 26. Two arcuate flanges 36 and 38 extend coaxially from diametrically opposite sides of this base flange. These arcuate flanges form stepped, angularly spaced, intermediate cam ramp sectors which cooperate with arcuate cam members 40 mounted for angular adjustment coaxially of the support member end flange. In the illustrative embodiment, the adjustable cam members 40 include separately formed sector gear plates 42 slidably mounted and retained within the annular groove 26. As best shown in FIGURE 3, each sector gear 42 is suitably secured to and supports an arcuately formed cam section member 44. The arcuate cam forming flanges of these several cam sector members slidably engage and cooperate with the adjacent intermediate cam sector flanges 36 and 38 of the annular member 34 to form adjustable angularly coextending cam ramp surfaces axially offset or stepped from the circular base flange of the support secured cam member 34.

A perforated plate 48 is suitably secured to the square end surface 28 of the support member end flange 22. This plate is centrally perforated at 50 and inwardly overlaps the outer periphery of the annular support member groove 26 and the gear tooth forming outer portions of the sector gear plates 42 slidably mounted therein. The plate 48 thus outwardly embraces the adjustable cam sectors 44 and cooperates with the base flange of the annular cam member 34 to slidably retain the cam supporting sector gear plates 42 within the annular groove 26 of the support member end flange. Each corner of the plate 48 is perforated at 52 and coaxially cooperates with the bore 30 and the counterbore 32 provided in the adjacent corner of the support member end flange to rotatably mount a cam and sector gear adjusting pinion 54. A central hub 56 of each pinion is rotatably mounted in one of the corner adjacent bores 30 in the support member end flange 22. The coaxial perforations 52 in the end flange secured plate 48 spacedly embrace the outer opposite ends of the several pinion hubs. The plate 48 thus overlaps the several end flange counterbores 32. A gear flange 58 formed intermediate the ends of each pinion hub is rotatably mounted in each counterbore 32 and retained therein by the adjacent overlapping portions of the end plate 48. The gear teeth formed on the flanged periphery of the several pinion gear members rotatably intersect the annular groove 26 of the support member and drivingly engage the gear teeth formed radially outwardly of the several sector gear plate members 42 to provide arcuate angular adjustment of the arcuate cam members 44 secured thereto.

To provide desired cam controlled actuation of the machine sequence controlling device 16, the several gear and cam sector members 40 are angularly adjusted relative to the fixed intermediate cam flanges 36 and 38 of the annular cam member 34. Such angular cam adjustment is effected in the illustrative control mechanism by independent manual rotation of control knobs 60 coaxially and drivingly connected to the several pinion gears 54. For safe in-service manual adjustment of the annular cam, these cam adjusting knobs are preferably spaced as shown from the adjustable cam elements to avoid operator interference with rotatably driven cam following elements of a control actuating means indicated generally by the reference numeral 64. The several pinion gears are normally secured in their cam selector adjusted positions by suitable means such as the nut locked set screws 62 shown in the several drawing figures. These set screws are threadable in the support member end flange and inwardly engage and secure the several pinion gear hubs 56 against rotation.

The control actuating means 64 is rotatably driven in synchronous phased relation with the power driving means of the associated machine or conveyor and includes a reciprocably mounted, rotatably driven control actuating member maintained in rotative engagement with the angularly adjusted annular cam formed by the several cooperating cam members mounted on the end flange of the support member.

The rotatably driven control actuating means 64 includes a hollow shaft member 66 of stepped diameter. The shaft 66 has a reduced diameter portion 68 journaled by flanged bushings 70 mounted in the cam supporting member 18 at opposite ends of the central bore 24. The hubs 72 of a shaft driving gear 74 is mounted on the reduced diameter end of the shaft 66 which projects outwardly of the bushing 70 mounted in the cylindrical flange of the support member. This gear hub is drivingly keyed at 76 and axially secured on the shaft end by a snap ring 78. The gear 74 is rotatably driven through suitable gear means operably connected and power driven in synchronized phased relation with the power driving means of the associated conveyor or machine. In the illustrative embodiment, the gear driving means includes a machine or conveyor drive synchronized gear 80 partially shown in FIGURE 1. The gear 80 drivingly engages the gear 74 and rotatably drives the cam following control actuating means of an adjacent machine controlling mechanism which controls different manufacturing operations of the conveyor associated machine.

The large diameter end 84 of the shaft 66 rotatably engages the adjacent flanged end of the support member mounted bearing 70. This large diameter shaft end is diametrically slotted at 86 to form parallel axially extending crosshead bearing surfaces. A centrally recessed plate 88 is secured to this large diameter end of the shaft and thus closes the crosshead bearing slot.

A hollow control actuating plunger 90 is reciprocably mounted by bearings 92 spaced axially within the shaft 66. The cam adjacent end of this plunger has a transverse arm portion 94 slidable within and drivingly rotated by the crosshead bearing end of the hollow shaft member. A nylon or similar plastic roller 96 is journaled on a stud or bolt 98 threadably mounted in the transverse plunger arm 94. This plunger supported roller rotatably engages the axially stepped cam surfaces formed by angularly adjusted, annular cam forming members 34 and 40. A helical spring 100 mounted within the center bore through the plunger 90 is compressively interposed between the central recess of the shaft secured end plate 88 and an opposing radial shoulder formed inwardly adjacent the distal end of the plunger 90. A nut locked bolt 102 is threadably mounted in the spring seating end of the plunger 90. The head of this bolt is operably engageable with the adjacent plunger or button 14 of the machine sequence controlling device 16.

The spring 100 acts through the plate 88 and shaft 66 to maintain a gear hub driven washer 104 in thrust bearing engagement with the flanged end of the adjacent bearing 70. The support member 18 thus provides axially fixed reaction for the spring which biases the rotatably driven plunger 92 axially of the support member journaled shaft 66 and normally maintains the roller 96 in rotative engagement with the axially stepped surfaces and arcuate ramps of the angularly adjusted annular cam. Such spring biasing action is operable intermediate the arcuate cam ramps of the adjusted annular cam to bias the plunger 90 into actuating engagement with the coaxially mounted plunger or button 14 of the control device 16. Such cam controlled actuation of the control device is operable to provide certain of the sequential operations required of the associated power driven machine.

From the foregoing, it will be seen that the support mounted angularly adjustable cam and the rotatably driven cam following means of the illustrative control mechanism cooperate in a novel manner providing the several stated objectives and advantages of the invention. It will be further apparent that various modifications and changes might be made in and from the structure of the disclosed embodiment without departing from the spirit and scope of the invention as defined in the following claims.

We claim:

1. An adjustable timing mechanism for modifying the sequential operation of an associated power driven machine, said mechanism comprising
   a support member,
   a shaft journaled in the support member,
   means for rotatably driving said shaft in synchronous phased relation to the associated machine,
   a first cam member secured to the support member and having a circular flange of limited arcuate dimension extending coaxial and spaced radially outwardly of said shaft and forming a fixed cam sector,
   a second cam member mounted on the support member for angular adjustment coaxially of said shaft and first cam member and having a circular flange of limited arcuate dimension cooperating with the arcuate flange of the first cam member to form an adjustable axially stepped machine controlling cam,
   means for adjusting said second cam member angularly relative to the first cam member to vary the axially stepped machine controlling cam during continued operation of the associated machine,
   machine controlling means including a cam following member reciprocably mounted and drivingly connected for rotation with said machine synchronized shaft,
   and means normally biasing said cam following member into machine controlling engagement with the axially stepped cam formed by angular adjustment of said cam sectors, 2. An adjustable timing mechanism sequentially operable to actuate a conveyor associated machine in accordance with the manufacturing requirements of conveyor transported workpieces, said timing mechanism comprising
   a support member having a bore therethrough mountable in fixed spaced relation to a machine controlling device,
   an arcuate flange carried by the support member oppositely of the machine controlling device and forming a fixed cam sector spaced radially outwardly and extending coaxially of said bore,
   adjustable cam means including a cam member mounted for angular adjustment coaxially of the support member bore and having an arcuate flange forming a movable cam sector cooperating with the fixed cam sector to form a stepped arcuately extensible machine controlling cam,
   rotary cam following means including a hollow shaft journaled within the bore of the support member,
   means for rotatably driving said hollow shaft in phased synchronous relation with the associated conveyor,
   a machine controlling member slidably mounted within and drivingly connected for rotation with said hollow shaft member and engageable with the stepped arcuate cam formed by said cam members to control the workpiece manufacturing operation of the conveyor associated machine,
   means normally biasing said shaft mounted member into machine controlling engagement with the stepped arcuate cam formed by said cam members,
   and means for angularly adjusting said second cam member to vary the arcuate extension of the stepped machine controlling cam during continued workpiece manufacturing operation of the associated machine and conveyor.

3. An adjustable timing device operable to modify the sequentially controlled operation of an associated power driven machine, said timing device comprising
   a support member,
   an annular member having a base portion secured to said support member and having at least one arcuate flange forming a fixed cam sector of limited angular dimension,
   a plurality of arcuate cam members mounted for angular adjustment coaxially of the annular member, said arcuate members each having a flange cooperating with a fixed cam sector flange on the annular member to form an extensible arcuate cam surface axially spaced from the base portion of the annular member,
   cam following means journaled by the support member coaxially of the annular member and rotatably driven in synchronous phased relation with the associated machine,
   said rotatably driven cam following means including a machine controlling member reciprocably mounted and rotatably engageable with the extensible cam surfaces formed by angular adjustment of the cam members relative to the fixed cam sectors of the annular member,
   means normally biasing said reciprocably mounted member toward machine controlling engagement with said extensible cam surfaces and toward the base portion of the annular member intermediate the adjustable cam members,
   and means for independently adjusting each of said angularly adjustable cam members relative to a cooperating fixed cam sector to vary the arcuate angular extension of each machine controlling cam surface during continued operation of the associated machine.

4. In combination with a device operable to control the operation of a conveyor associated machine, a conveyor synchronized timing mechanism adjustable and sequentially operable to actuate the machine controlling device in accordance with the manufacturing requirements of conveyor transported workpieces, said timing mechanism comprising
   a support member mounted in spaced relation to the machine controlling device and having a bore therethrough,
   an annular cam member secured to an end face of the support member distal from said device and having at least one arcuate flange spaced radially outwardly and extending coaxially of said bore and forming a fixed cam sector,
   adjustable cam means including a plurality of cam sectors mounted for angular adjustment coaxially of the annular cam member and support member bore and each having an arcuate flange cooperating with a fixed cam sector of the annular cam member to form an extensible arcuate cam ramp,
   means for independently adjusting each of said angularly adjustable cam sectors relative to its cooperating fixed cam sector to vary the arcuate angular extension of each machine controlling cam ramp during continued operation of the associated machine and conveyor, a hollow shaft journaled within the bore of the support member, means for driving said shaft in synchronous phased relation to the associated conveyor, cam following means including a control actuating member slidably mounted within and drivingly connected for rotation with the hollow shaft member, a roller carried by the control actuating member and rotatably engageable with the extensible machine controlling ramps formed by angular adjustment of the cam sectors, and means normally biasing the cam following control actuating member to maintain roller and cam ramp engagement and operable intermediate the cam ramps to shift the control actuating member into sequential actuating engagement with the machine controlling device.

5. In combination with a device operable to control sequential manufacturing operations performed by a machine on conveyor transported workpieces, timing mechanism adjustable to modify sequential actuation of the machine controlling device in accordance with desired variations in workpiece manufacturing requirements, said timing mechanism comprising a support member mounted in spaced relation to the machine controlling device, a cam member having an annular base portion secured to the support member and an arcuate flange forming a fixed cam sector of limited angular dimension, two arcuate cam and sector gear members each having an arcuate cam flange mounted for limited angular adjustment coaxially of the fixed cam sector flange on the annular member, gear means for independently adjusting said cam and gear sectors relative to the fixed cam sector to vary the arcuate machine controlling angular extension of the sector formed cam ramp during continued operation of the associated machine and conveyor, a shaft journaled in said support member coaxially of said annular cam member, means for rotatably driving said shaft in synchronous phased relation to the workpiece transporting drive of the associated conveyor, a cam following member reciprocably mounted and drivingly connected to said shaft and rotatably engageable with the extensible machine controlling ramp formed by angular adjustment of said cam sectors, and means normally biasing said cam following member toward cam ramp engagement and operable therebetween to shift said member into sequential actuating engagement with the machine controlling device.

6. In combination with a device operable to control a conveyor synchronized machine, a timing mechanism adjustable to actuate the control device sequentially in accordance with the manufacturing requirements of conveyor transported workpieces, said timing mechanism comprising means including a support member having a cylindrical bore extending centrally therethrough and spaced axially of the machine controlling device, an end flange extending radially outwardly adjacent the end of the central bore distal from the control device and a cylindrical flange extending coaxially of said bore from said radial end flange toward the control device, said radial end flange having a cylindrical groove spaced concentrically and radially outwardly of said bore and opening to the end face of the radial flange opposite said cylindrical flange, an annular cam member fixedly secured to the end face of the radial flange and partially overlapping the inner periphery of said groove, said annular cam member having at least one arcuate flange forming a fixed cam sector projecting coaxially of said bore, a centrally perforated plate member secured to said radial flange and partially overlapping the outer periphery of said groove, a plurality of arcuate cam sector members slidably mounted within said groove each having at least one arcuate flange projecting coaxially of the central bore and cooperating with one cam sector of the fixed annular cam member to form a cam ramp angularly and arcuately extensible to vary the machine controlling operation of said device, means for adjusting each of cam sector members relative to the cooperating fixed cam sectors to vary the arcuate angular extensions of each machine controlling cam ramp independently during continued operation of the associated machine and conveyor, a hollow shaft member rotatably journaled within the bore of said support member and projecting outwardly therefrom, means including a gear secured to the end of the shaft member projecting outwardly of the cylindrical flange of the support member and connectable to drive said shaft member in synchronous phased relation to the associated conveyor, the end of the shaft member projecting outwardly of the radially flanged opposite end of the support member having a diametrical crosshead bearing slot formed therein, a hollow plunger reciprocably mounted within the hollow shaft member and having a transverse arm portion slidable within the crosshead bearing slot and drivingly rotating the plunger with the shaft member, a cam engaging roller rotatably mounted on said transverse arm portion outwardly of the crosshead bearing slot of the shaft member and rotatably engageable with each extensible machine controlling cam ramp formed by angular adjustment of said cam sector members relative to an adjacent fixed cam sector flange on the support secured annular cam member, and spring means compressively interposed between said shaft member and plunger and normally biasing said plunger and roller toward cam ramp engagement and operable therebetween to shift said plunger axially of the shaft member into actuating engagement with the machine controlling device.

7. An adjustable timing mechanism operable to control and synchronize the sequential operation of a conveyor associated machine in accordance with the manufacturing requirements of conveyor transported workpieces, said timing mechanism comprising means including a support member mountable in spaced relation to a machine sequence controlling device, said support member having a radial flange distal from the control device and a cylindrical flange extending toward the control device and having a central bore extending coaxially therethrough, said radial flange having an annular groove spaced concentrically and radially outwardly of the bore and opening oppositely of the cylindrical flange, an annular member secured to the radial flange of the support member inwardly of the annular groove and having at least one arcuate flange forming a fixed cam sector coaxial with said bore, a plurality of arcuate cam and sector gear members slidably mounted within said groove each having a plurality of sector adjusting gear teeth formed thereon and an arcuate flange cooperating with a fixed cam sector of the annular member to form an angularly adjustable machine controlling cam of axially stepped dimension, a perforated plate secured to the radial flange of the supporting member and inwardly overlapping the outer periphery of the annular groove to retain said cam and gear sector members within said groove, means including a plurality of angularly spaced pinion gears journaled in the radial flange of the support member and rotatably engaging and operable to adjust each of said arcuate cam and sector gear members independently relative to the cooperating fixed cam sectors to vary the arcuate angular extensions of the several machine controlling cams during continued operation of the associated machine and conveyor, a hollow shaft rotatably journaled within the bore of the support member and projecting outwardly therefrom, drive means including a gear secured to the hollow shaft outwardly of the cylindrical flange of the support member and operably connected to rotate said hollow shaft in synchronous phased relation to the associated conveyor, said hollow shaft having a transverse slide bearing slot outwardly of the radially flanged end of the support member, cam following means including a control actuating member slidably mounted within the hollow shaft and having a transverse portion slidably mounted within the transverse bearing slot of the hollow shaft and drivingly rotated therewith, a cam engaging roller rotatably mounted on said transverse portion outwardly of the bearing slot in the hollow shaft and rotatably engageable with the extensible machine controlling cams formed by angular adjustment of said cam and gear sector members relative to the fixed cam sectors, and spring means compressively interposed between said hollow shaft member and the control actuating member and normally biasing said control actuating member toward cam and roller engagement and operable intermediate said axially stepped arcuate cams to bias said control actuating member into actuating engagement with said machine sequence controlling device.

8. In a machine controlling device adjustable to modify the sequential operation of an associated power driven machine, a support having a bore spaced from the control device, a shaft journaled within said bore and rotatably driven in synchronous phased relation to the associated machine, a plurality of cam members mounted on the support and having cam ramp forming arcuate flanges projecting coaxially of the bore and shaft, at least one of said cam members forming a sector gear mounted for angular arcuate adjustment and cooperating with the other cam members to form an adjustable annular cam, rotatable cam actuated means including a control member for said device mounted for reciprocation and coaxial rotation with the shaft, a roller journalled on said control member and engageable with the annular cam formed by the cam and sector gear members, means normally biasing the control member to effect machine controlling cam roller engagement and reciprocation between the adjusted arcuate flanges of the cam members, and pinion means rotatably mounted and engageable to adjust each sector gear cam member independently of the other cam members to vary the machine controlling contour of the annular cam during continued operation of the associated machine.

9. In a timing mechanism adjustable to modify the sequential actuation of a control device for an associated power driven machine, a support having a bore spaced from the control device, a plurality of arcuately flanged cam members mounted on the support coaxially of the bore and cooperating to form an annular cam having at least one angularly adjustable cam ramp, a shaft journaled within the bore of the support and rotatably driven in synchronous phased relation to the associated machine, cam actuated means including a control actuating member mounted for reciprocation and rotation coaxially of the shaft and having an arm engageable with the angularly adjustable annular cam, means normally biasing said control actuating member toward cam engagement and into actuating engagement with the machine controlling device intermediate said flanged cam members, and means on said support for angularly adjusting said cam members independently during continued operation of the associated machine.

10. In a timing mechanism adjustable to modify the sequential operation of a power driven machine, a support, a shaft journaled in said support, means for rotatably driving said shaft in phased synchronous relation to the drive of the associated machine, a plurality of arcuate cam members mounted on the support coaxially of the bore and shaft for arcuate angular adjustment and cooperating to form an annular machine controlling cam, machine sequence controlling means including a control member mounted for coaxial rotation with the shaft and reciprocably maintained in machine controlling engagement with the annular cam, and means on said support for angularly adjusting said cam members during continued operation of the associated machine.

11. A timing device adjustable to control the sequential operation of a power driven machine comprising a support member, a shaft journaled in said support member, means for rotatably driving said shaft in synchronous phased relation to the drive of the machine, a plurality of arcuate cam and sector gear members mounted on the support member for angular adjustment and having cam forming flanges projecting coaxially of said bore and shaft and cooperating to form an adjustable annular cam, machine controlling means including a control member mounted for rotation and machine controlling reciprocation coaxially of the shaft and rotatably engageable with the annular cam formed by said cam and sector gear members, and pinion means rotatably engageable to adjust each sector gear cam member independently to vary the machine controlling contour of the annular cam during continued operation of the power driven machine.

12. In a timing device adjustable to control the sequential operation of an associated power driven machine, support means, means rotatably mounted by said support means and driven in synchronous phased relation to the associated machine, a plurality of arcuate cam and sector gear members mounted by said support means for angular adjustment coaxially of the rotatably driven means and having cam forming flanges cooperating to form an annular sequence controlling cam, machine controlling means including a control member mounted for rotation and machine controlling reciprocation coaxially of said rotatably driven means and rotatably maintained in sequence controlling engagement with the annular cam formed by said cam and sector gear members, and means rotatably mounted by said support means and engageable to adjust said sector gear cam members angularly during operation of the associated machine.

13. An adjustable timing machinism for controlling the sequential operation of a power driven machine comprising support means, machine controlling means rotatably mounted by said support means and driven in synchronous phased relation to the drive of the machine, a plurality of arcuate cam members mounted on the support means for arcuate angular adjustment about the rotative axis of said machine controlling means and cooperating to form an annular machine controlling cam, said rotatably driven machine controlling means including a member coaxially and reciprocably mounted and maintained in engagement with the annular cam and operable to control the sequential operation of the machine in accordance with the cam effected reciprocation of said member, and means for angularly adjusting said machine controlling cam members during operation of the associated machine.

References Cited by the Examiner

UNITED STATES PATENTS

| | | | |
|---|---|---|---|
| 2,211,741 | 8/1940 | Elwell | 74—56 |
| 2,478,500 | 8/1949 | Parsons | 74—568 X |
| 2,484,471 | 10/1949 | Shinn | 74—22 |
| 2,781,738 | 2/1957 | Paasche | 118—2 |
| 2,982,319 | 5/1961 | Magnuson | 222—70 |
| 3,192,796 | 7/1965 | Peeps et al. | 74—568 |

BROUGHTON G. DURHAM, *Primary Examiner.*

WESLEY S. RATLIFF, *Examiner.*